United States Patent
Jones et al.

(10) Patent No.: US 10,963,465 B1
(45) Date of Patent: Mar. 30, 2021

(54) RAPID IMPORTATION OF DATA INCLUDING TEMPORALLY TRACKED OBJECT RECOGNITION

(71) Applicant: Palantir Technologies Inc., Denver, CO (US)

(72) Inventors: Samuel Jones, New York, NY (US); Sean Hacker, Washington, DC (US)

(73) Assignee: Palantir Technologies Inc., Denver, CO (US)

( * ) Notice: Subject to any disclaimer, the term of this patent is extended or adjusted under 35 U.S.C. 154(b) by 0 days.

(21) Appl. No.: 15/801,591

(22) Filed: Nov. 2, 2017

Related U.S. Application Data

(60) Provisional application No. 62/550,503, filed on Aug. 25, 2017.

(51) Int. Cl.
*G06F 16/2455* (2019.01)
*G06F 16/245* (2019.01)
*G06F 16/23* (2019.01)
*G06F 16/25* (2019.01)

(52) U.S. Cl.
CPC .......... *G06F 16/2456* (2019.01); *G06F 16/23* (2019.01); *G06F 16/245* (2019.01); *G06F 16/25* (2019.01)

(58) Field of Classification Search
None
See application file for complete search history.

(56) References Cited

U.S. PATENT DOCUMENTS

| 5,848,415 A * | 12/1998 | Guck ............... G06F 16/258 707/831 |
| 5,978,475 A | 11/1999 | Schneier et al. |
| 6,253,203 B1 | 6/2001 | O'Flaherty et al. |

(Continued)

FOREIGN PATENT DOCUMENTS

| CN | 101729531 | 6/2010 |
| CN | 103281301 | 9/2013 |

(Continued)

OTHER PUBLICATIONS

Daan Van Britsom; "Using Data Merging Techniques for Generating Multidocument Summarizations"; 2015; IEEE; pp. 576-592.*

(Continued)

*Primary Examiner* — Mariela Reyes
*Assistant Examiner* — Jermaine A Mincey
(74) *Attorney, Agent, or Firm* — Knobbe, Martens, Olson & Bear, LLP

(57) ABSTRACT

Systems and methods for rapid importation of data including temporally tracked object recognition. One of the methods includes receiving datasets each indicating information associated with one or more objects. Information indicating unique identifying information associated with the objects is accessed, and an updated dataset joining information from datasets that is associated with each object is generated. The updated dataset is maintained to include most recent versions of each of the datasets, with one or more datasets being replaced with more recent versions, and with one or more other datasets being propagated to be the most recent versions. Queries received from clients are responded to, with the queries indicating requests for specific information related to objects.

20 Claims, 7 Drawing Sheets

(56) References Cited

U.S. PATENT DOCUMENTS

| | | | |
|---|---|---|---|
| 6,295,541 B1* | 9/2001 | Bodnar | G06F 16/275 |
| 6,725,240 B1 | 4/2004 | Asad et al. | |
| 6,807,569 B1 | 10/2004 | Bhimani et al. | |
| 7,017,046 B2 | 3/2006 | Doyle et al. | |
| 7,069,586 B1 | 6/2006 | Winneg et al. | |
| 7,225,468 B2 | 5/2007 | Waisman et al. | |
| 7,596,285 B2 | 9/2009 | Brown et al. | |
| 7,770,032 B2 | 8/2010 | Nesta et al. | |
| 7,801,871 B2 | 9/2010 | Gosnell | |
| 7,962,495 B2 | 6/2011 | Jain et al. | |
| 8,181,253 B1 | 5/2012 | Zaitsev et al. | |
| 8,190,893 B2 | 5/2012 | Benson et al. | |
| 8,196,184 B2 | 6/2012 | Amirov et al. | |
| 8,239,668 B1 | 8/2012 | Chen et al. | |
| 8,301,904 B1 | 10/2012 | Gryaznov | |
| 8,312,546 B2 | 11/2012 | Alme | |
| 8,646,080 B2 | 2/2014 | Williamson et al. | |
| 8,683,322 B1 | 3/2014 | Cooper | |
| 8,726,379 B1 | 5/2014 | Stiansen et al. | |
| 8,769,412 B2 | 7/2014 | Gill et al. | |
| 8,782,794 B2 | 7/2014 | Ramcharran | |
| 8,931,043 B2 | 1/2015 | Cooper et al. | |
| 9,021,260 B1 | 4/2015 | Falk et al. | |
| 9,049,117 B1 | 6/2015 | Nucci et al. | |
| 9,100,428 B1 | 8/2015 | Visbal | |
| 9,335,897 B2 | 5/2016 | Goldenberg | |
| 9,338,013 B2 | 5/2016 | Castellucci et al. | |
| 2002/0112157 A1 | 8/2002 | Doyle et al. | |
| 2002/0156798 A1* | 10/2002 | Larue | G06F 17/30575 |
| 2004/0123139 A1 | 6/2004 | Aiello et al. | |
| 2004/0153418 A1 | 8/2004 | Hanweck | |
| 2004/0250124 A1 | 12/2004 | Chesla et al. | |
| 2005/0157662 A1 | 7/2005 | Bingham et al. | |
| 2005/0229256 A2 | 10/2005 | Banzhof | |
| 2005/0262556 A1 | 11/2005 | Waisman et al. | |
| 2005/0275638 A1 | 12/2005 | Kolmykov-Zotov et al. | |
| 2006/0031928 A1 | 2/2006 | Conley et al. | |
| 2006/0069912 A1 | 3/2006 | Zheng et al. | |
| 2006/0179003 A1 | 8/2006 | Steele et al. | |
| 2006/0212931 A1 | 9/2006 | Shull et al. | |
| 2006/0218637 A1 | 9/2006 | Thomas et al. | |
| 2006/0265747 A1 | 11/2006 | Judge | |
| 2007/0143851 A1 | 6/2007 | Nicodemus | |
| 2007/0294766 A1 | 12/2007 | Mir et al. | |
| 2008/0104407 A1 | 5/2008 | Horne et al. | |
| 2008/0201580 A1 | 8/2008 | Savitzky et al. | |
| 2008/0222706 A1 | 9/2008 | Renaud et al. | |
| 2008/0229422 A1 | 9/2008 | Hudis et al. | |
| 2009/0103442 A1 | 4/2009 | Douville | |
| 2009/0228701 A1 | 9/2009 | Lin | |
| 2009/0328222 A1 | 12/2009 | Helman et al. | |
| 2010/0077481 A1 | 3/2010 | Polyakov et al. | |
| 2010/0100963 A1 | 4/2010 | Mahaffey | |
| 2010/0179831 A1 | 7/2010 | Brown et al. | |
| 2010/0235915 A1 | 9/2010 | Memon et al. | |
| 2010/0262688 A1 | 10/2010 | Hussain et al. | |
| 2010/0330801 A1 | 12/2010 | Rouh | |
| 2011/0060910 A1 | 3/2011 | Gormish et al. | |
| 2011/0202555 A1 | 8/2011 | Cordover et al. | |
| 2011/0219450 A1 | 9/2011 | McDougal et al. | |
| 2012/0078981 A1* | 3/2012 | Gradin | G06F 17/30964 707/812 |
| 2012/0079592 A1 | 3/2012 | Pandrangi | |
| 2012/0084866 A1 | 4/2012 | Stolfo | |
| 2012/0110633 A1 | 5/2012 | An et al. | |
| 2012/0110674 A1 | 5/2012 | Belani et al. | |
| 2012/0169593 A1 | 7/2012 | Mak et al. | |
| 2012/0218305 A1 | 8/2012 | Patterson et al. | |
| 2012/0254129 A1 | 10/2012 | Wheeler et al. | |
| 2012/0284791 A1 | 11/2012 | Miller et al. | |
| 2012/0330801 A1 | 12/2012 | McDougal et al. | |
| 2013/0019306 A1 | 1/2013 | Lagar-Cavilla et al. | |
| 2013/0097709 A1 | 4/2013 | Basavapatna et al. | |
| 2013/0110876 A1 | 5/2013 | Meijer et al. | |
| 2013/0139268 A1 | 5/2013 | An et al. | |
| 2013/0239217 A1 | 9/2013 | Kindler et al. | |
| 2014/0013451 A1 | 1/2014 | Kulka et al. | |
| 2014/0059683 A1 | 2/2014 | Ashley | |
| 2014/0123279 A1 | 5/2014 | Bishop et al. | |
| 2014/0143009 A1 | 5/2014 | Brice et al. | |
| 2014/0173712 A1 | 6/2014 | Ferdinand | |
| 2014/0173738 A1 | 6/2014 | Condry et al. | |
| 2014/0188895 A1 | 7/2014 | Wang et al. | |
| 2014/0229422 A1 | 8/2014 | Jain et al. | |
| 2014/0283107 A1 | 9/2014 | Walton et al. | |
| 2014/0366132 A1 | 12/2014 | Stiansen et al. | |
| 2015/0039565 A1 | 2/2015 | Lucas | |
| 2015/0128274 A1 | 5/2015 | Giokas | |
| 2015/0188715 A1 | 7/2015 | Castelluci et al. | |
| 2015/0229664 A1 | 8/2015 | Hawthorn et al. | |
| 2015/0248563 A1 | 9/2015 | Alfarano et al. | |
| 2015/0261847 A1 | 9/2015 | Ducott et al. | |
| 2015/0326601 A1 | 11/2015 | Grondin et al. | |
| 2016/0004864 A1 | 1/2016 | Falk et al. | |
| 2016/0028759 A1 | 1/2016 | Visbal | |
| 2017/0177888 A1* | 6/2017 | Arora | G06F 17/30554 |
| 2018/0075115 A1* | 3/2018 | Murray | G06F 16/2456 |
| 2018/0262864 A1* | 9/2018 | Reynolds | H04L 67/303 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| NL | 2011642 | 8/2015 |
| WO | WO 2005/010685 | 2/2005 |

OTHER PUBLICATIONS

Baker et al., "The Development of a Common Enumeration of Vulnerabilities and Exposures," Presented at the Second International Workshop on Recent Advances in Intrusion Detection, Sep. 7-9, 1999, pp. 35.

Bhuyan et al., "Network Anomaly Detection: Methods, Systems and Tools," First Quarter 2014, IEEE.

Crosby et al., "Efficient Data Structures for Tamper-Evident Logging," Department of Computer Science, Rice University, 2009, pp. 17.

FireEye—Products and Solutions Overview, <http://www.fireeye.com/products-and-solutions> Printed Jun. 30, 2014 in 3 pages.

FireEye, <http://www.fireeye.com/> Printed Jun. 30, 2014 in 2 pages.

Glaab et al., "EnrichNet: Network-Based Gene Set Enrichment Analysis," Bioinformatics 28.18 (2012): pp. i451-i457.

Hur et al., "SciMiner: web-based literature mining tool for target identification and functional enrichment analysis," Bioinformatics 25.6 (2009): pp. 838-840.

Lee et al., "A Data Mining and CIDF Based Approach for Detecting Novel and Distributed Intrusions," Lecture Notes in Computer Science, vol. 1907 Nov. 11, 2000, pp. 49-65.

Ma et al., "A New Approach to Secure Logging," ACM Transactions on Storage, vol. 5, No. 1, Article 2, Published Mar. 2009, 21 pages.

Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.

Schneier et al., "Cryptographic Support for Secure Logs on Untrusted Machines," The Seventh USENIX Security Symposium Proceedings, USENIX Press, Jan. 1998, pp. 53-62, https://www.schneier.com/paper-secure-logs.pdf.

VirusTotal—About, <http://www.virustotal.com/en/about/> Printed Jun. 30, 2014 in 8 pages.

Waters et al., "Building an Encrypted and Searchable Audit Log," Published Jan. 9, 2004, 11 pages, http://www.parc.com/content/attachments/building_encrypted_searchable_5059_parc.pdf.

(56) References Cited

OTHER PUBLICATIONS

Zheng et al., "GOEAST: a web-based software toolkit for Gene Ontology enrichment analysis," Nucleic acids research 36.suppl 2 (2008): pp. W385-W363.

\* cited by examiner

Example Data from Dataset 1.
Please Select Core Field Columns

52

| Column 1 | Column 2 | Column 3 | Column 4 |
|----------|----------|----------|----------|
| Value | Value | Value | Value |
| Value | Value | Value | Value |
| Value | Value | Value | Value |

RAPID IMPORTATION OF DATA INCLUDING TEMPORALLY TRACKED OBJECT RECOGNITION

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

TECHNICAL FIELD

The present disclosure relates to systems and techniques for data integration, analysis, and visualization. More specifically, this disclosure relates to importation and processing of disparate datasets spread across computing systems.

BACKGROUND

A corporation may generate large quantities of information, such as logs indicating user access, virtual private network (VPN) connections, information associated with employees, and so on, and may store this information in numerous databases. These logs may include tables of information, and may include millions, hundreds of millions, billions, and so on, rows of disparate items of information with the logs including little useful contextual information. While the corporation may have a need to ask complex questions whose answers are contained in combinations of this data, being able to parse and process the information presents large technical hurdles. For example, a corporation may have an immediate need to rapidly identify computer systems that conform to a set of constraints (e.g., particular applications execute on the computer systems, particular users have utilized the computer systems, the computer systems are located in particular physical areas, and so on).

Since disparate systems can, with some regular frequency, generate logs, this mass of logs can pile up leaving the corporation with little daylight into the information. As an example, a domain controller may generate logs associated with security authentication requests. As another example, logs may automatically be generated that specify user access rights, for example based on an access control list. Both of these types of logs may include information, which in combination, can be useful to a reviewing user.

Additionally, incorporating new types of logs, updated logs, modified logs, and so on, can result in deep-rooted errors that can propagate through analyses being performed based on the logs. Without systems and processes to rapidly ingest and process logs, this log information can be of limited use.

SUMMARY

As will be described, a technical scheme to rapidly incorporate disparate log information related to various objects (e.g., computer systems, users, any entity being monitored), such that complex queries can be posed that utilize some, or all of, information associated with one or more objects. For example, particular logs (e.g., database tables) may include information associated with a particular type of object (e.g., computer system), such as one or more uniquely identifying values for each object (e.g., fully qualified domain name, media access control address, and so on). These particular logs may further specify secondary information for each object, such as information that describes a context in which the particular logs were generated. As an example, a first type of log may identify unique computer systems, and may further indicate user accounts used to access the computer systems, applications that are installed on the computer systems, a system role of the computer system, and so on. As another example, a second type of log identify applications utilized by user accounts during particular computing sessions. The system described herein can utilize these example logs, along with multitudes of other types of logs, to quickly enable complex analyses. For example, the system can enable a reviewing user (e.g., security officer) to determine whether a particular user account utilized a particular application on specific computer systems, computer systems of a particular system role, and so on.

Based on large quantities of logs, or other structured or unstructured information, the system can generate an ontological representation of each object. For example, each type of log may include a subset of information related to an object that is of use to a reviewing user. The system can ingest the large quantities of logs, and prepare an ontological representation of the objects that includes the full set of information related to each object of use to the reviewing user.

As will be described, the user can generate information utilized by the system to identify unique objects, and further utilized by the system to select particular columns of information that the reviewing user wishes to preserve. As an example, the user can specify that for a user account object, the user account is uniquely identified by user account name, and that the user prefers to preserve date of creation, locations from which the user account provides requests, and so on. The user can specify the above information for multitudes of datasets, logs, and so on, such that the system can quickly generate a holistic view of each object. Optionally, the user can specify this information in a file, and optionally as will be described the user can cause generation of this information through interactions with one or more user interfaces. For example, a system can present a summary of each dataset to the user, and the user can quickly select zero or more columns that are to be preserved. Based on these selections, the system can generate the ontological information for the objects.

Furthermore, particular events can be generated based on the logs, with an event representing a particular occurrence for which a reviewing user is interested. For example, the reviewing user can indicate that the system is to generate information indicating occurrences of (1) a particular system (2) executing a particular application and (3) a particular user account accessing the particular system and (4) using the particular application within (5) a range of times. As will be described, since the system has generated an ontological representation of each object (e.g., computer system, user account, application, and so on), the system can quickly provide a response to the reviewing user with the requested information.

In this way, the systems and methods improve the functioning of the computer and recite technical benefits. For example, the system enables complex analyses to be performed using otherwise impenetrable data generated in the normal course of any automated computer system's existence. While this data can otherwise be stored for posterity, or deleted after being stored for a threshold amount of time (e.g., a month), the system described herein can preserve this data for utilization by reviewing users. As an example of utilizing the data, a zero-day exploit may be released into the wild, and a security officer may have a very immediate need to identify computer systems that could be affected. The system can identify all computer systems that were turned on during a prior period of time, and which include a particular application associated with the exploit. In addition, the system can identify the computer systems which had the particular application activated, and further which computer systems had particular actions performed via the particular application, which computer systems were being utilized by a user account with particular permissions, and so on.

This sort of rich analysis can be easily performed through utilization of the system, which was not possible in prior systems. Furthermore, the system can ensure that information related to each object, which as described above can be pulled from numerous dataset, is up to date. For example, the system can store different versions of a same dataset, such as datasets received periodically in time. If a reviewing user requests to view current (e.g., up to date) information, the system can use the most recently received version of each dataset. As will be described, information from a dataset can be propagated forward in time from when it was received, such that the current information may include older information from a dataset that represents the most recently received version of the dataset. Thus, the system can track each object through time, and present current versions of information associated with each object.

Accordingly, in various embodiments, large amounts of data are automatically and dynamically calculated interactively in response to user inputs, and the calculated data can be efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, the interactions with information, such as information stored abstractly in databases, cannot reasonable be performed by humans alone. Similarly, displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIG. 1C illustrates an example user interface for determining object definitional information.

DETAILED DESCRIPTION

Terms

Figure 1A:
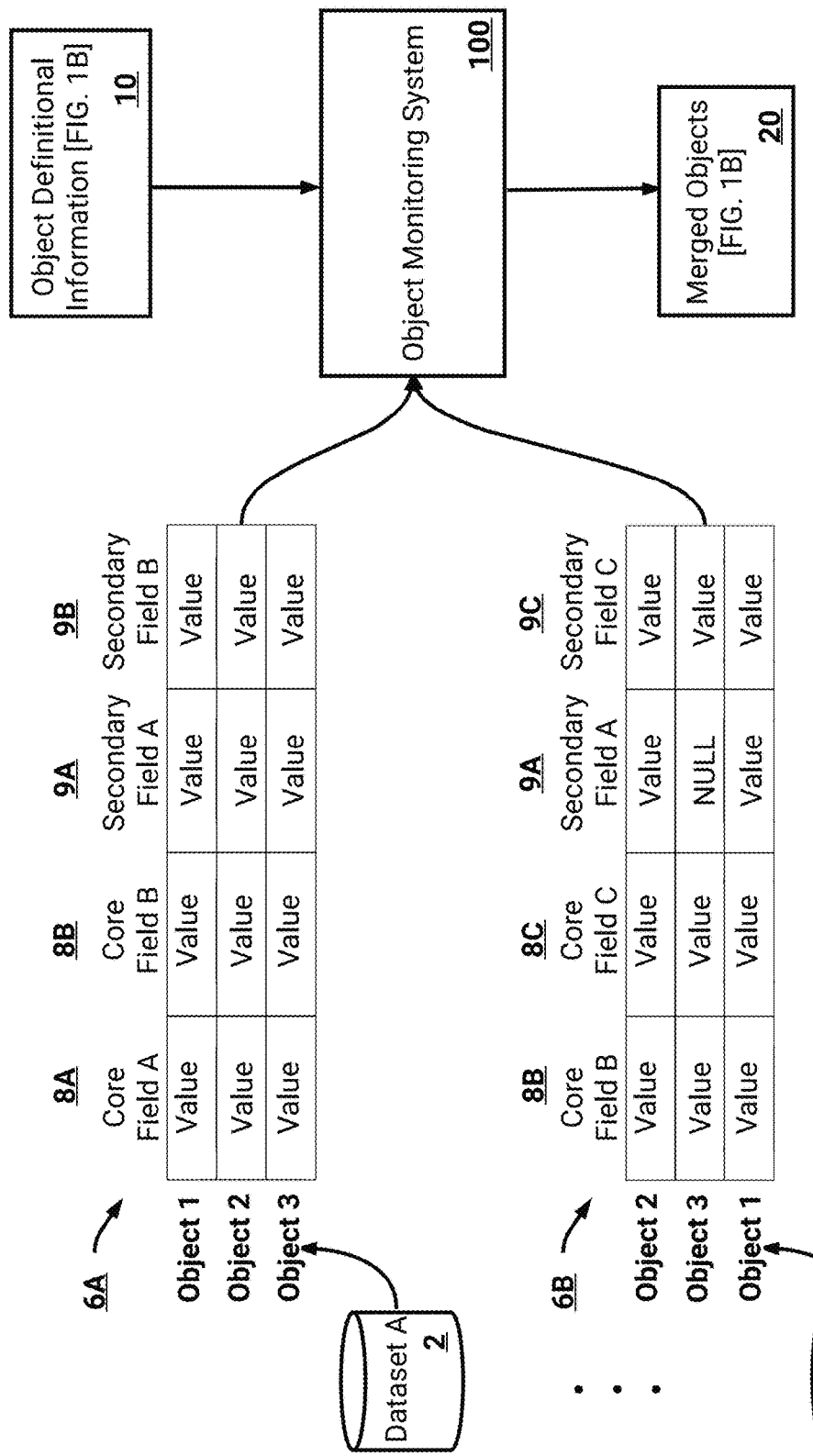
FIG. 1A illustrates a block diagram of an object monitoring system generating merged objects.

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g., metadata about the object) may be represented in one or more properties.

An object may be an item or entity being tracked across datasets. For example, an entity may be a computer system, a user account, and so on. As will be described, an ontological representation of each object can be generated. This ontological representation can include information specific to the object, such as core fields and secondary fields defined below.

Object Type: Type of a data object (e.g., Computer System, Person, Event, or Document). Object types may be defined by an ontology and may be modified or updated to include additional object types. An object definition (e.g., in an ontology) may include how the object is related to other objects, such as being a sub-object type of another object type (e.g., an agent may be a sub-object type of a person object type), and the properties the object type may have.

Dataset: A grouping of information that specifies information associated with objects. The dataset can be a database table, structured information (e.g., JavaScript Object notation information), unstructured information (e.g., a collection of information), and so on. With respect to the example of a database table, the database table can include multiple columns and rows, with the columns indicating fields of information associated with objects, and the rows indicating particular values of the fields. For example, a field can be associated with a unique identifier, and values for the field (e.g., rows) can specify the unique identifiers.

Properties: Attributes of a data object that represent individual data items. At a minimum, each property of a data object has a property type and a value or values.

Property Type: The type of data a property is, such as a string, an integer, or a double. Property types may include complex property types, such as a series data values associated with timed ticks (e.g., a time series), etc.

Property Value: The value associated with a property, which is of the type indicated in the property type associated with the property. A property may have multiple values.

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Core Fields: Unique fields for objects, which can be spread around multiple datasets. A core field can optionally uniquely identify each object, or may uniquely identify each object in combination with one or more other core fields. For example, a fully qualified domain name can be a core field which may, in some embodiments, uniquely identify a system (e.g., computer system laptop, and so on). As another example, a name of a system may, in combination with a physical location of the system, uniquely identify the system.

Secondary Fields: Information describing a context in which a dataset was generated. For example, a secondary field can include whether a system is a server, a system role of a system, an address of a user, a phone number of a user, and so on. The secondary fields can, as described above, be particular columns in a database table. These secondary fields can be utilized to describe an object, for example in an ontological representation of the object as described above.

Overview

This specification describes a system (e.g., the object monitoring system 100 described below) that can receive disparate datasets associated with objects, and generate merged objects from the datasets. For example, as described above an object may include an entity being monitored (e.g., tracked) throughout the disparate systems. Example objects can include systems (e.g., computer system, laptop, tablet, wearable device, and so on), users (e.g., customers, network accounts), applications (e.g., software applications executing on systems), vulnerabilities (e.g., software or hardware vulnerabilities), and so on. As will be described, the system can utilize object definitional information that defines one or more types of objects (e.g., system, users, applications, and so on) to merge any identified objects in the datasets. For example, the object definitional information can specify one or more core fields that uniquely identify objects of a particular type (e.g., fully qualified domain name, user account identifier, email address, and so on), and particular datasets that include one or more of the core fields. As another example, the object definitional information can specify one or more secondary fields, for example from particular datasets, whose associated values are to be obtained and stored with each object.

The system can identify all unique objects of a particular type, and using the object definitional information, can generate an ontological representation of each object. For example, the ontological representation can include, for each object, the core fields and secondary fields spread throughout the datasets. As will be described below, the system can generate the ontological representation of an object based on merging information associated the object from the disparate datasets. For example, and with respect to the datasets being database tables, the system can perform one or more join operations with respect to particular identifying information associated with the object.

As an example of a join operation, and with respect to a system object type, the system can utilize fully qualified domain names to merge objects specified in datasets. For example, a first dataset can include multitudes of rows with each row specifying a particular fully qualified domain name associated with a system. A second dataset can include multitudes of rows each specifying a particular fully qualified domain name associated with a system. The system can merge (e.g., join) these two datasets such that a row from each dataset that specifies a same fully qualified domain name can be merged. Additional join operations can be performed, for example between datasets that do not include same identifying information. With respect to the first and second datasets described above, a third dataset may not specify fully qualified domain names. For this third dataset, the system can join the third dataset based on other identifying information that is shared with either, or both, of the first and second datasets. As an example, a static internet protocol (IP) address may be specified, such as an IPv6 address. The system can join the system objects described in the third dataset based on their respective IPv6 addresses. In this way, the system can merge information associated with each object, which is spread throughout multitudes of datasets.

As will be described below, the object definitional information may specify some, or all, of the information described above to generate merged objects. For example, and as will be described below with respect to FIG. 1B, the object definitional information can specify types of objects that are to be merged. That is, the object definitional information can include different sections, with each section describing a respective object type. The object definitional information can specify datasets that are to contribute to the construction of a final object by indicating core fields and secondary fields for each dataset. Additionally, the object definitional information can include definitions regarding how to join the datasets and coalesce the varying fields from the datasets. Optionally, the object definitional information can indicate in which datasets the above information can be located. Optionally, the object definitional information can specify datasets that may include information associated with each type of object, and each dataset may further indicate core fields, secondary fields, and so on, associated with a type of object. In this way, the system can utilize the object definitional information to (1) identify one or more type of objects, (2) determine information to obtain from each dataset, (3) and merge the determined information associated with each identified object.

As will be described, a particular user can rapidly generate this object definitional information, for example the reviewing user can view a dataset and easily incorporate the dataset in the object definitional information. Optionally, the object definitional information can be a file (e.g., a text file), that enables the particular user to quickly define the information described above. Furthermore, and as will be described below with respect to FIG. 1C, the system, or a presentation system in communication with the system, can present interactive user interfaces that include summary information associated with datasets. This summary information can identify, for example, particular columns included in the dataset. The particular user can interact with the user interfaces to specify columns that are associated with core fields and/or secondary fields. As an example, the particular user can select columns to be designated as core fields (e.g., with respect to a user device with a touch screen, the particular user can select a column with a first pressure, or for a particular duration), and optionally columns to be designated as secondary fields (e.g., the particular user can select a column with a second pressure, or for a different duration).

Subsequent to generating the ontological representation of each object, the system can traverse through datasets and store information indicating occurrences of each object. For example, the system can obtain historical versions of each dataset and store information indicating occurrences of each object in the historical versions. As will be described below, each historical version can optionally be associated with a respective time. An example of time can include a time at which the dataset was generated, the time at which the system received, or processed, the dataset, and so on. Optionally, for datasets that specify timestamps, the system can utilize the timestamp information. Thus, a first dataset can be separated according to time, such as a time of its generation as described above. As will be described, a reviewing user can utilize this time information for complex queries in which time information may be useful. For example, the reviewing user can specify information that, based on a specified time, may be included one or more particular versions of the first dataset.

However, each dataset may not include information for all objects. As an example, a first dataset generated for a particular time period (e.g., a particular day) may include information for an example object. A second dataset generated for the particular time period may not include information to the example object. For the subsequent time period, the first dataset may not include information for the example object, while the second dataset may include information. To ensure that the reviewing user can view up to date information, as will be described information from the first dataset may be propagated forward to the subsequent time period. As an example, the reviewing user can request information associated with the example object at the subsequent time period. Since the first dataset does not include information for the subsequent time period, a naive implementation may provide the reviewing user with only information from the second dataset. However as will be described, the system can propagate the information from the first dataset to the subsequent time period. In this way, the reviewing user can access up-to date information from all datasets.

FIG. 1A illustrates a block diagram of an object monitoring system 100 generating merged objects. As described above, the object monitoring system 100 can receive datasets (e.g., datasets A-B 1, 2) specifying information associated with objects, and generate merged objects 20 based, at least in part, on object definitional information 10. The object monitoring system 100 can be a system of one or more computers, one or more virtual machines executing on a system of one or more computers, and so on. Additionally, the object monitoring system 100 can be in communication with one or more databases, distributed databases, data storage systems, and so on. The distributed databases can include multitudes of distributed worker nodes (e.g., systems of one or more computers, virtualizes resources executing on systems, and so on) that can process information (e.g., perform complex merge, join, store, load, operations) and can parallelize tasks to increase performance.

In the example of FIG. 1A, a first table 6A is illustrated as being stored in dataset A 2. While the examples herein describe tables, it should be understood that other structured or unstructured information may be utilized. For example, a JavaScript Object Notation (JSON) object may include information associated with multitudes of objects. In a JSON object, fields may be specified according to a particular format (e.g., attribute-value pairs), and the object monitoring system 100 can analyze the received JSON objects. As another example, unstructured information may be received. The object monitoring system 100 can analyze the unstructured information for occurrences of particular identifiers associated with objects. For example, the unstructured information can specify a particular object and the system can analyze the subsequent information according to one or more processes. An example process could include the subsequent information being stored in a known format (e.g., information related to an object may be separated by comma or colon).

The first table 6A includes five columns that specify information relating to objects 1-3. As illustrated, the first column is associated with core field A 8A, and the second column is associated with core field B 8B. As described above, these core fields can specify unique information associated with objects 1-3. While the illustration indicates these are core fields, the first table 6A can include identifiers associated with these columns. As will be described, the object definitional information 10 can be utilized by the object monitoring system 100 to determine which column corresponds to a core field. Similarly, the first table 6A includes two secondary fields 9A, 9B. As described above, these secondary fields 9A, 9B, can represent a context for which the first table 6A was generated. Additionally, the second fields 9A, 9B, can indicate information included in the table 6A that a particular user, or the object monitoring system 100, prefers to store (e.g., store for posterity, such that queries can be run against the information).

As an example, a secondary field 6A can indicate a person in charge of a department in which a system (e.g., objects 1-3 can represent systems) is located. This information may be beneficial if a reviewing user needs to rapidly identify systems that may be subject to a particular exploit. For example, upon identifying systems that may be subject to a particular exploit, the reviewing user can then cause an automatic notification to be presented for display to the person in charge. Since this can be time-sensitive information, the object monitoring system 100 can provide the notification for real-time display to the person (e.g., an application executing on a user device of the person may be activated via the generated notification). Additional example secondary fields can include a system role, MAC address, an operating system type, applications installed on a system, a domain associated with a system, whether a system is a server, one or more user names of users who accessed a system, and so on.

Second table 6B includes information related to objects 1-3, and includes core fields and secondary fields. Since second table 6B is being obtained from dataset B4, second table 6B may be generated for a different purpose than table 6A. For example, second table 6B may have been generated by a domain controller. In contrast, first table 6A may have been generated via one or more systems that monitor for vulnerabilities executing on other systems. As described above, combinations of datasets can provide rich insights into the complex functioning and interactions between various objects. In the example described above, first table 6A may provide information associated with user accesses to systems, and second table 6B may provide information related to vulnerabilities. These two tables 6A, 6B, may therefore inform whether a particular user accessed a system later determined to have a detected vulnerability.

Figure 1B:
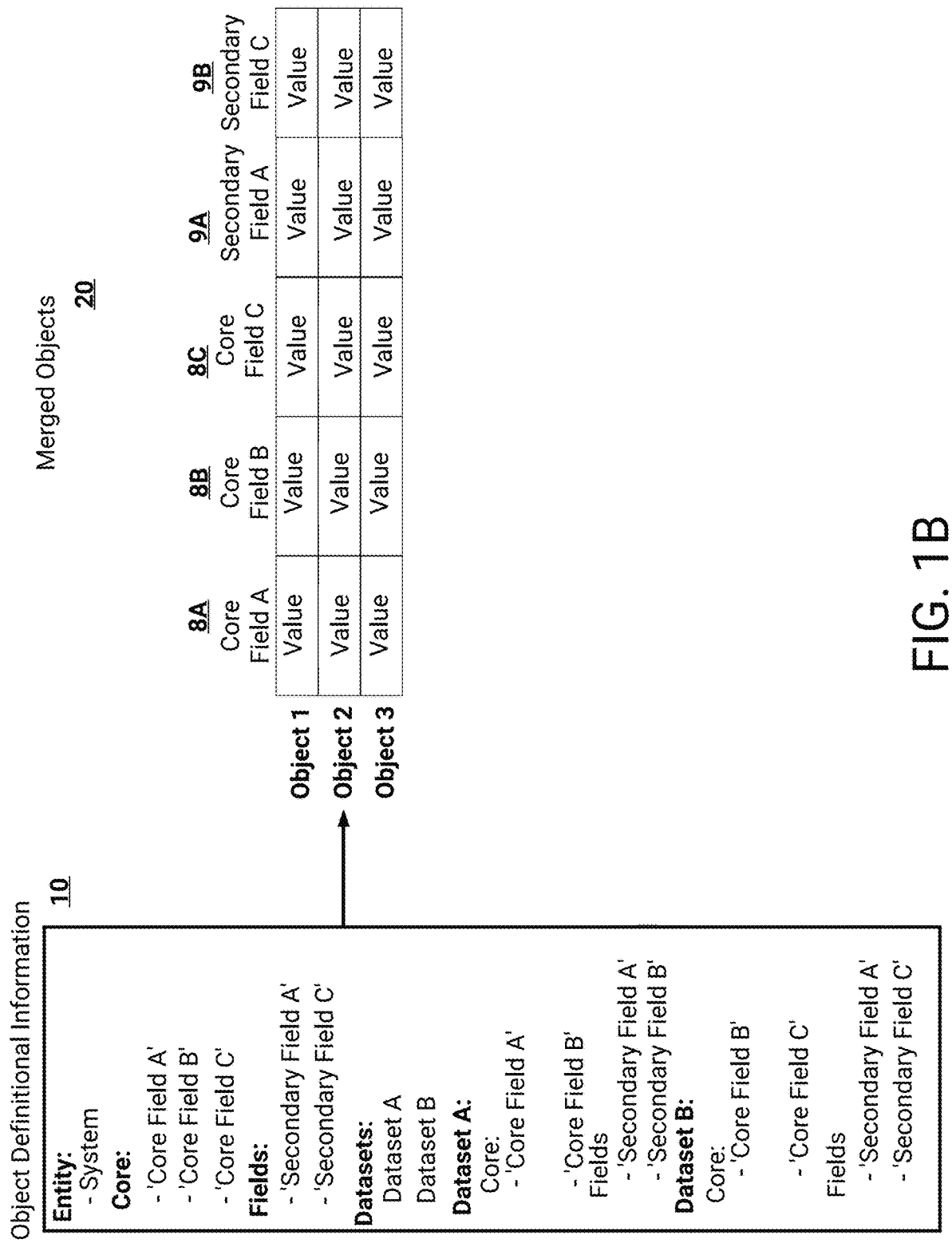
FIG. 1B illustrates a representation of object definitional information being utilized to generate merged objects.

Thus, second table 6B can include zero or more of the core fields which first table 6A includes. In the example of FIG. 1A, second table 6B includes core field B 8B, which was included in first table 6A, and core field C 8C. Similarly, second table 6B includes secondary field A 9A, which was included in first table 6A, and secondary field C 9C. The objects are indicated as being in a distinct order than the objects in the first table 6A. Since the datasets are being generated by disparate systems, for example based on occurrences of events, and so on, the datasets may, as an example, not include objects in a same order. As illustrated, secondary field A 9A includes a NULL value for object 3. As will be described, the object monitoring system 100 can determine a single value for any secondary field that is to be preserved (e.g., stored in an ontological representation of an associated object). For example, the object monitoring system 100 can prefer to utilize a value from a particular dataset, and then if the particular dataset lacks a value, can utilize a value from a different dataset. As illustrated in FIG. 1B, object 3 includes a value for secondary field 9A, which as an example may have been obtained from first table 6A.

The object monitoring system 100 can receive dataset A2 and dataset B4 and generate merged objects 20. As will be described in more detail below, these merged objects may represent an ontological representation of each object. That is, each dataset can indicate a portion of the known information related to each object. For example, dataset A 2, as described above, may be associated with a domain controller. Other datasets may be associated with virtual private network logs, other types of access logs, user actions on systems, and so on. Collectively, this information can be combined to provide a more holistic view of each object. The ontological representation of each object therefore represents this more holistic view.

FIG. 1B illustrates a representation of object definitional information 10 being utilized to generate merged objects 20. As described above, the object definitional information 10 can specify information, which in some implementations, may be sufficient to generate merged objects. As illustrated in FIG. 1B, the object definitional information 10 includes textual data that can be utilized by the object monitoring system 100 to merge information associated with same objects that is spread around multiple datasets. In the example of FIG. 1B, the object definitional information 10 represented is directed to a system type of object (e.g., 'entity'). The information 10 can include information directed to multiple types of objects, and a particular user can rapidly define how the object monitoring system 100 is to ingest datasets.

A particular user can quickly enter the textual information, for example based on viewing information from each dataset. As an example, the object monitoring system 100 can collect (e.g., gather) all datasets being generated from any system. With respect to datasets being generated by a system, as described above numerous systems in a large entity (e.g., corporation) may be routinely generating information. For example, individual laptops, computers, and so on, may generate system logs. Similarly, servers, active directory systems, and so on, may generate multiple logs each specifying particular information. The object monitoring system 100 can obtain these datasets from disparate sources, and can present summary information to the particular user. As an example, the object monitoring system 100 can generate user interface information that indicates identifiers associated with columns in datasets. The particular user can then specify the columns that are to be assigned as core fields, and the columns that are to be assigned as secondary fields.

Optionally, for any column specified as a core field, the object monitoring system 100 can automatically select a column with a same identifier in a different dataset as being a core field. Similarly, optionally the particular user can specify identifiers associated with core fields, and the object monitoring system 100 can identify all datasets that include the identifiers. Furthermore, optionally the object monitoring system 100 can identify identifiers that comport with identifiers specified by the particular user. As an example, the particular user can specify that an internet protocol (IP) address is to be a core field. The object monitoring system 100 can parse each dataset to determine whether any identifiers of columns may be associated with an IP address. For example, the object monitoring system can determine a measure of closeness of each identifier to the particular user specified IP address (e.g., Levenshtein distance, based on a technical thesaurus, and so on). In this way, the object monitoring system 100 can determine that 'IPv6' corresponds to IP address. Additionally, optionally the object monitoring system 100 can determine whether a column is associated with, for example, an IP address based on the values indicated in the column. In the case of an IP address, the object monitoring system 100 can determine whether the values are numbers and whether they conform to the IP address standard. Similarly, if the particular user specified a MAC address, the object monitoring system 100 can determine whether the values conform to a MAC address standard.

As illustrated in the example of FIG. 1B, the object definitional information 10 indicates that there are three core fields (e.g., core fields A-C) that are to be identified in datasets. Similarly, the object definitional information 10 indicates that there are two secondary fields (e.g., secondary fields A-B) that are to be identified in datasets. The information 10 further indicates datasets (e.g., Dataset A, Dataset B) that are to be utilized to obtain information associated with the type of object (e.g., "system"). The information 100 then specifies that dataset A includes core fields A and B, and that dataset B includes core fields B and C. However as described above, the object definitional information 10 can indicate the three core fields (e.g., core fields A-C), and the object monitoring system 100 can determine whether dataset A or dataset B includes any of the core fields. Similarly, the object definitional information 10 indicates that secondary fields A and C are to be preserved from any dataset that includes these secondary fields. As illustrated, the object definitional information 10 specifies that dataset A includes secondary fields A, B. Similarly, the object definitional information 10 specifies that dataset B includes secondary fields B, C.

Optionally, the object definitional information 10 can specify a ranking of datasets for which a value specified in a secondary field is to be obtained. As an example, a first dataset may include a value for an operating system type of a system. A second dataset may include a value for an operating system type of the system. In some cases, these values may conflict for the same system, due to data integrity issues, propagation of inaccuracies, and so on. Therefore, the object definitional information 10 can optionally specify that the value from the first dataset is preferred. If the object monitoring system 100 analyzes the first dataset and does not find a value (e.g., the value is NULL for example), the object monitoring system 100 can then utilize the second dataset.

Based on the object definitional information 10, the object monitoring system 100 can process the received datasets to identify all core fields and secondary fields included in the received datasets. With respect to the object monitoring system 100 being a distributed system, for example with distributed worker nodes as described above, the worker nodes can each process a portion of the datasets. The object definitional information 10 can be provided to each worker node, such that the worker node can identify information that is to be preserved. In this way, the worker node can limit an extent to which network calls (e.g., local area networks, virtual networks) are required.

For each dataset, the object monitoring system 100 can therefore identify columns corresponding to core fields and secondary fields. Subsequently, the object monitoring system 100 can obtain the rows associated with these columns and then merge the rows between datasets. As an example, and as described above, the object definitional information 10 can indicate one or more core columns that are to be uses for join operations. As an example, a core column can be an email address of a user or a fully qualified domain name of a system. The object monitoring system 100 can therefore join these disparate datasets, and obtain merged objects 20 indicating the core fields and secondary fields that were previously spread around the datasets.

FIG. 1B illustrates an example representation of merged objects 20. As illustrated, objects 1-3 are included in the representation 20, and each object is illustrated with its associated core fields 8A-8C and secondary fields 9A-9B. Similarly, the object monitoring system 100 may optionally store information associated with each object in a different dataset (e.g., different table).

As will be described below, with respect to FIG. 4, the object monitoring system 100 can generate a unique identifier for each object that is based on its associated core field values. For example, the object monitoring system 100 can compute a hash (e.g., MD5) of the values indicated in core fields 8A-8C. As an example, the object monitoring system 100 may not receive updated information for a particular object for a lengthy time period. In this example, upon receipt of one or more updated datasets, in which updated information for the particular object is specified, the system 100 can identify the particular object (e.g., according to the core fields), and associate the updated information the particular object's historical information. Thus, this unique identifier can be utilized by the system 100 to uniquely identify an object, such that it can be monitored (e.g., over time, creating a record of the object). Additionally, the object monitoring system 100 can identify all instances of each object in the datasets. In this way, the object monitoring system 100 can respond to queries that request information from particular times (e.g., a particular time range, a particular time such as a day, and so on). When responding to these queries, the object monitoring system 100 can generate merged objects 20 based on datasets as they existed at the particular times.

As described above, each dataset can be associated with a particular time, such as a time of its generation, a time of receipt by the object monitoring system 100, and so on. The object monitoring system 100 can generate merged objects 20 based on the most recently received version of each dataset. For the versions of a dataset, a particular object may appear in a subset of the versions. That is, and as an example, for a particular day the particular object might be included in the dataset, and on a subsequent day the particular object may not be included in the dataset. Therefore, the object monitoring system 100 can utilize information from the particular day for the particular object until receipt of updated information for the particular object.

For example, if the object monitoring system 100 received datasets A, B and C, the object monitoring system 100 can identify whether a particular object is included in each of the datasets. Table 1 below illustrates three days that datasets A-C were received, and whether the particular object was referenced in datasets A-C.

TABLE 1

|  | Dataset A | Dataset B | Dataset C |
| --- | --- | --- | --- |
| Day 1 | X | X |  |
| Day 2 |  | X |  |
| Day 3 |  |  | X |

As illustrated in the above table, on day 1 datasets A and B included information for the particular object. The object monitoring system 100 can utilize core fields and secondary fields included in datasets A-B to merge the information for the particular object as described above. Additionally, if a reviewing user provides a query that utilizes datasets A and B, the object monitoring system 100 can utilize the information from datasets A and B for the particular object when responding.

On day 2, a new version of dataset B is received, with the new version specifying information for the particular object (e.g., updated information). Therefore, on day 2 the object monitoring system 100 can utilize the information from day 2 as the current state of the particular object. That is, the object monitoring system 100 can replace the information received for day 1 with the information received for day 2. Thus, when responding to an example query received from a reviewing user (e.g., a query requesting current information), the object monitoring system 100 can utilize the day 2 information for the particular object. However, since the object monitoring system 100 does not have information from dataset A for day 2, the information from dataset A for day 1 is propagated forward to day 2. When the object monitoring system 100 generates merged objects 20, as described above, it will then use dataset A as received on day 1 along with dataset B as received on day 2. Additionally, when responding to the example query the object monitoring system 100 can utilize the day 1 information of dataset A for the particular object.

On day 3 dataset C is received, and as illustrated in the table, dataset C includes information for the particular object. Thus, the object monitoring system 100 can utilize this new information when generating merged objects 20. For example, the information from dataset C can be incorporated based on the core fields and/or secondary fields indicated in object definitional information.

The object monitoring system 100 can there ensure that information for each object is based on a most up to date version of the datasets that includes information for the object. For instance, the table illustrated above can be on a per object basis, such that information for each object can be propagated forward in time.

As described above the object monitoring system 100 can respond to queries that indicate particular times. For these queries, the object monitoring system 100 can utilize information from versions of datasets associated with the particular times. Similar to the above description of propagating information, the object monitoring system 100 can ensure that for a time indicated in a query, the information utilized is the most current for that time. As an example with respect to Table 1, the object monitoring system 100 may receive a query associated with day 2. For this query, the object monitoring system 100 can utilize information for the particular object that is current as of day 2. As described above, this information includes dataset A as received on day 1, and dataset B as received on day 2.

FIG. 1C illustrates an example user interface 50 for determining object definitional information. User interface 50 can be an interactive user interface presented on a user device of a user, such as a laptop, tablet, computer, wearable device, mobile device, and so on. Optionally, user interface 50 may be a document, such as a web page, that is presented on the user device (e.g., rendered). For example, the user device may present the web page, and interactions with the web page may be processed, at least in part, via a web application executing on an outside system (e.g., the object monitoring system 100, a presentation system in communication with the object monitoring system 100). Optionally, user interface 50 can be presented via an application on the user device (e.g., an 'app' downloaded from an electronic application store).

As described above, object definitional information 10 can specify particular core fields and/or secondary fields that are included in datasets. The information 10 can be quickly specified, and the object monitoring system 100 can then analyze the datasets to generate merged objects 20. The example user interface 50 can be utilized to automatically generate object definitional information 10, such that users can visually indicate core fields and/or secondary fields. As illustrated, the user interface 50 includes example information from 'dataset 1'. The user interface 50 can automatically populate with information from newly received datasets. As an example, the user interface 50 may present information from the object monitoring system 100 indicating newly included datasets. A user of the user interface 50 can interact with the user interface 50 to specify particular columns in a newly included dataset that are to be core fields and/or secondary fields.

As described above, the user may select a column using a touch screen, or optionally using a mouse, keyboard, and so on. For example, the user may select column 1 52 and the user interface 50 can optionally update to reflect the selection (e.g., column 1 52 can be shaded or colored differently than remaining columns). The selection can further indicate whether column 1 52 is to be a core field or a secondary field. For example, the user can press for a particular length of time or within a particular range of forces to indicate a core field or a secondary field. Additionally, upon selection of column 1 52, the user interface 50 can update to request whether column 1 52 is to be a core field or a secondary field. Optionally, user interface 50 may automatically illustrate particular columns that were indicated in other datasets as being core fields and/or secondary fields. For example, if dataset 1 describes users, the user interface 50 may automatically cause a column indicating email addresses to be highlighted, colored, shaded, and so on.

Optionally, user interface 50 may present a portion of dataset 1. For example, a threshold number of rows from dataset 1 may be included in the user interface 50. In this way, a user of user interface 50 can quickly determine which columns are to be selected. The user interface 50 may further present a portion of multiple datasets, for example a threshold number of datasets that have not been reviewed yet. Optionally, user interface 50 can indicate identifiers of columns of the datasets, and not present values included in the columns. As an example, the user interface 50 can present the identifiers and a user of the user interface 50 can select (e.g., select a check box, swipe left or right on the identifiers, and so on) whether the identifiers are to be core fields and/or secondary fields.

Object Centric Data Model

To provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information. Optionally, the clustering behavior determination system 100 may implement features described herein.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

Figure 2:
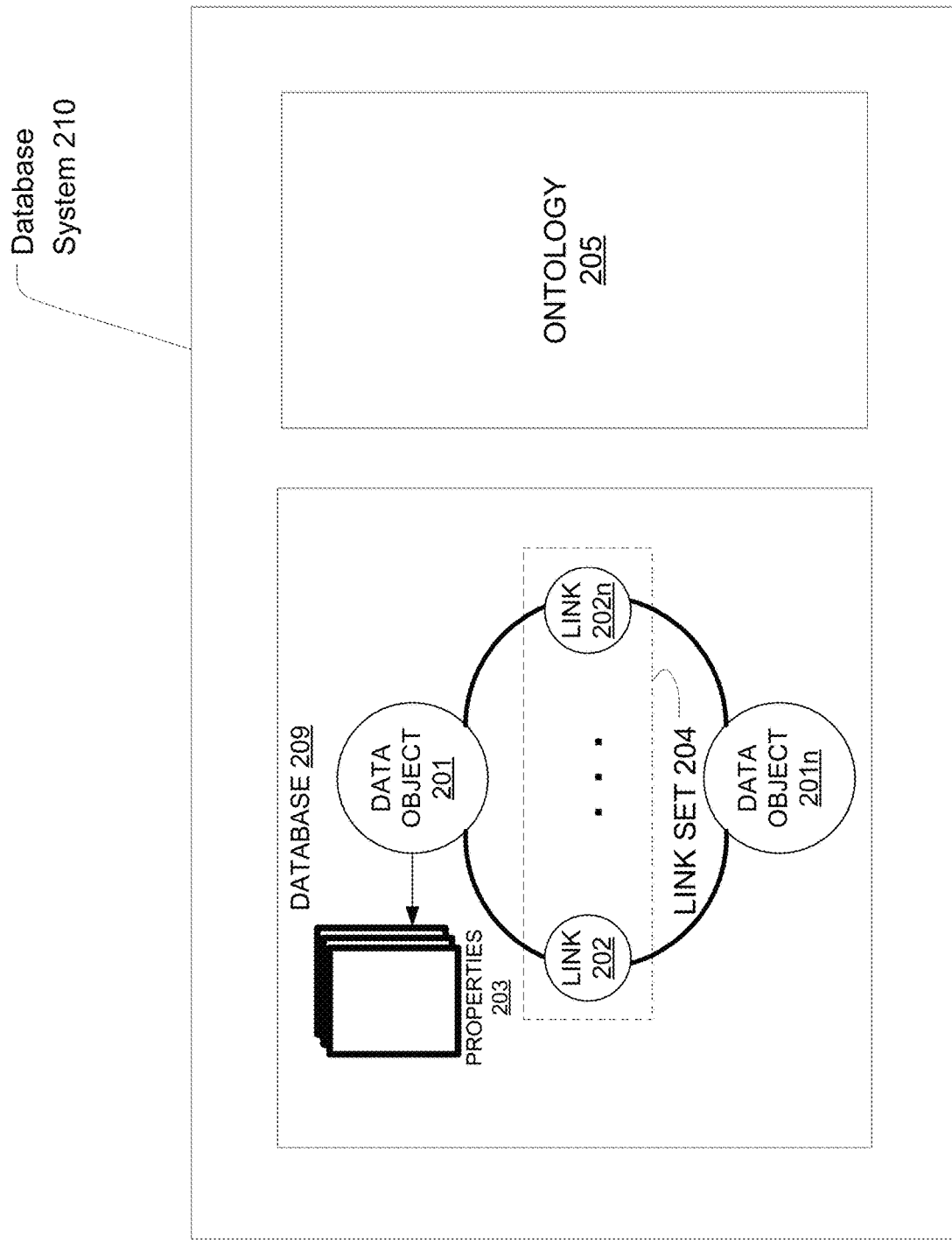
FIG. 2 illustrates one embodiment of a database system using an ontology.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article. Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 205.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205. The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
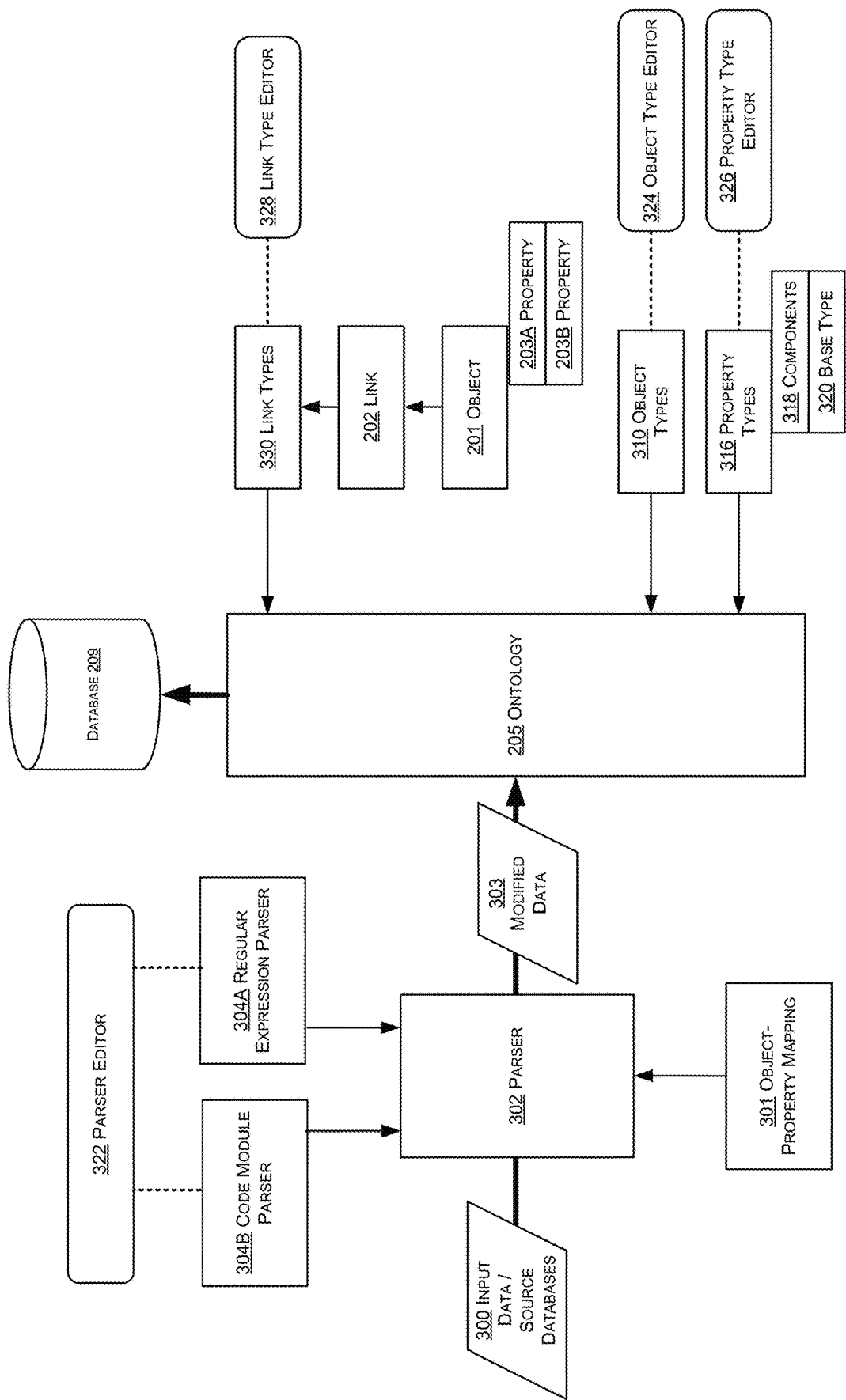
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

Figure 4:
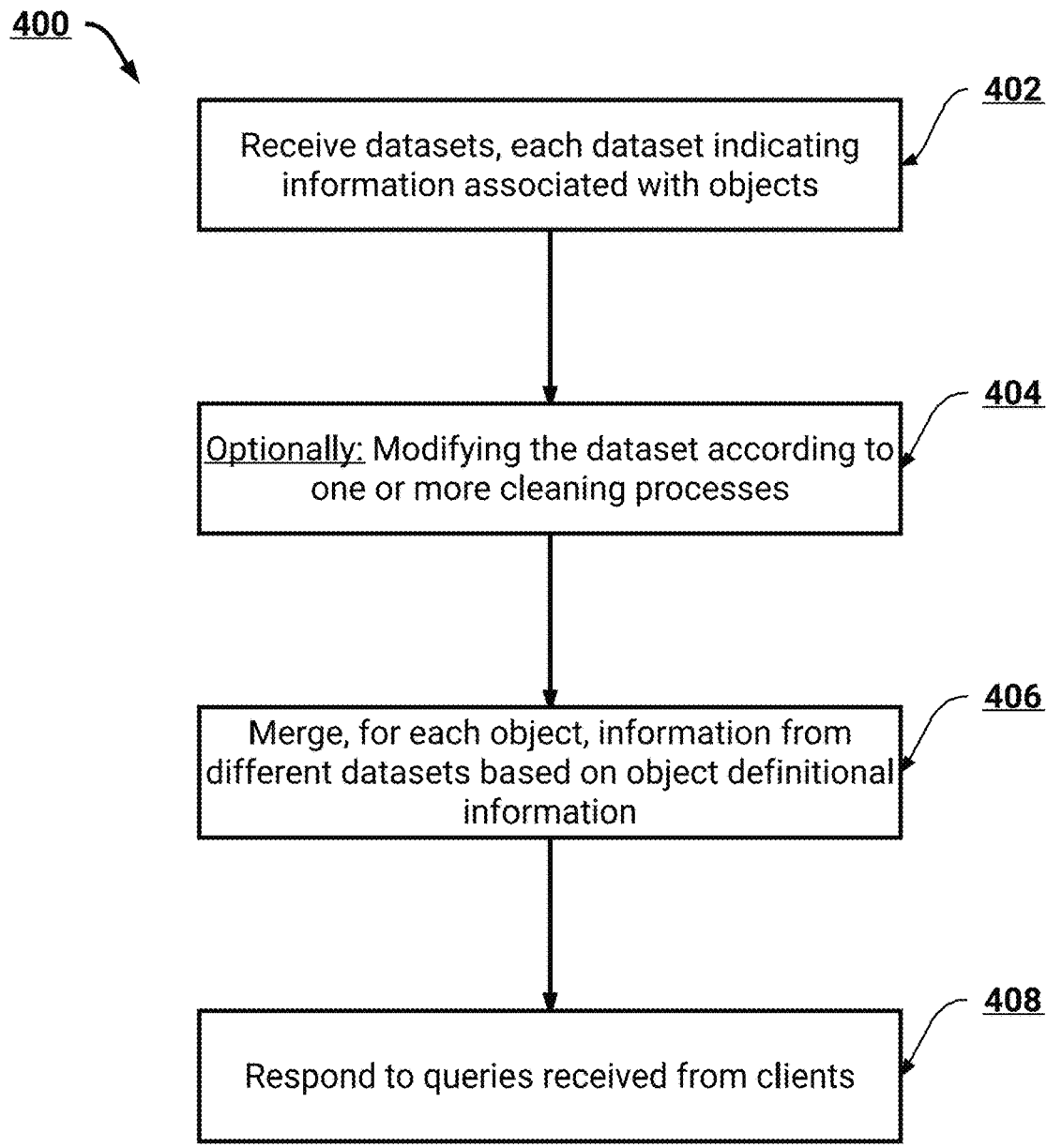
FIG. 4 is a flowchart of an example process for generating merged objects referenced in datasets.

FIG. 4 is a flowchart of an example process 400 for generating merged objects referenced in datasets. For convenience, the process 400 will be described as being performed by a system of one or more computers (e.g., the object monitoring system 100). The process 400 may include some, or all, of the below described blocks, and the blocks may be performed by the system in any order.

The system receives datasets indicating information associated with objects (block 402). As described above, datasets can be generated based on occurrences of events (e.g., user logins, system events, and so on), and can include information associated with particular objects (e.g., users, systems, user accounts, and so on). The system can receive the datasets and, as described above, rapidly ingest the datasets for processing.

The system optionally modifies the datasets according to one or more cleaning processes (block 404). Since the datasets may include raw data, the system can apply cleaning processes to adjust the datasets into a usable form. For example, the system can remove white spaces, punctuation, make values lower case, and so on. Additionally, the system can extract values using regular expressions. As an example, a particular column of a dataset may include valuable information in information that can be discarded. The system can extract the valuable information, such that the cleaning dataset includes the valuable information.

The system merges information from different datasets (block 406). As described above, with respect to FIGS. 1A-1B, the system can utilize information (e.g., object definitional information) to generate merged objects. As an example, the information can define a type of an object (e.g., system, user, application, and so on), and in which datasets information for the type of object is included. Furthermore, information can specify core fields for the type of object, such as uniquely identifying information, and in which datasets the core fields are located. Similarly, the information can specify secondary fields that are to be retrieved for the objects (e.g., contextual information associated with the datasets).

The system utilizes the information to obtain all core fields and secondary fields for each object. For example, the system can join the datasets based on one or more of the core fields, and then retain the core fields and secondary fields. This information can then be stored, and as described above, as information changes over time the system can monitor the changes. For ease of referencing each object, the system can generate a unique identifier for each object. As described above, the unique identifier can be a hash of the core fields, and the system can utilize the hash to monitor the object as information changes.

Based on the values of the core fields, the system can traverse the datasets and identify occurrences of each object in the datasets. In this way, the system can store information indicating datasets, and optionally times associated with each dataset, that each object was seen. For example, and with respect to Table 1 described above, the particular object was seen by the system on days 1, 2, and 3. As described above, the system can generate summary information for the particular object any each of these days. As an example, on day 1 the summary information would include information from Datasets A and B, and on day 2 the summary information would include information from Dataset A with updated information for Dataset B, and so on. In this way, the system can generate an up to date view of any object for a specified time (e.g., a particular day). Therefore, the system can generate merged information for each object, for every point in time. That is, the system can obtain the core fields and secondary fields for each object, based on all versions of the datasets. As described above, with respect to Table 1, different versions of datasets may be received over time (e.g., periodic updates). The system can thus generate historical versions of the merged information for each object, such that summary information for each object can be quickly presented to reviewing users. As an example, a reviewing user may request information for a particular application object, and the system can present up to date merged information for the application object. Additionally, the system can present historical merged information, so that the reviewing user can view how the application object changed over time. For example, the merged information may specify computer systems that execute the application, updates that have been made to the application, vulnerabilities associated with the application, users who commonly use the application, and so on.

Optionally, in addition to generating merged information for each object, the system can create event objects for particular occurrences. For example, the object definitional information may specify particular events of interest, and the system can analyze the datasets to identify events. The system may record information describing the specified time and/or duration of the occurrence of an event. An event can specify one or more object types that are associated with the event, e.g., the occurrence of two objects interacting. As an example, a particular event can indicate that a system object type, a user object type, and an application object type, are associated with the particular event. Additionally, datasets that are to be utilized can be specified. Since each dataset, as an example, can specify information for multiple objects, the above system, user, and application, object types may optionally be included in a same dataset. Additionally, the object types may be spread around different datasets, and the object definitional information can specify the datasets.

An event can further specify information for each object type indicated in the event that is to be utilized. With respect to the particular event described above, the system can utilize particular information for each of the object types. For example, a user name associated with each user object can be obtained, along with an identifier of each system object (e.g., global system resource ID) and a product name and version of each application object. In this way, the system can generate resulting information that very easily illustrates users who utilize particular applications on particular systems.

The system responds to queries received from clients (block 408). The system can receive queries from clients, and using the above-described merged information and/or event information, can respond. As described above, a query can indicate current (e.g., most up to date) information, or optionally can indicate that prior information be utilized. For example, a query can specify that information is current as of a prior date be utilized, or information is from within a particular time period. As an example of a query, a particular query can request a list of systems that have not been rebooted in the last 24 hours, and that execute a particular application. The system can analyze the particular query, and based on the merged information, can determine systems indicated as not having been rebooted (e.g., a secondary field can be included in the merged information indicating a time of last reboot). If a secondary field for the system objects specifies applications, the system can easily determine which systems execute the particular application. However, if there is no corresponding secondary field, the system can obtain merged information for the particular application. This merged information can then be utilized to determine systems on which the particular application executes. The system can then provide a list of systems that conform the particular query. Similarly, a subsequent query may request that the list specify systems for which the particular application was actually utilized in the last 24 hours. The system can utilize merged information, for example based on a dataset for each system that indicates applications executed, to respond to the subsequent query.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 5:
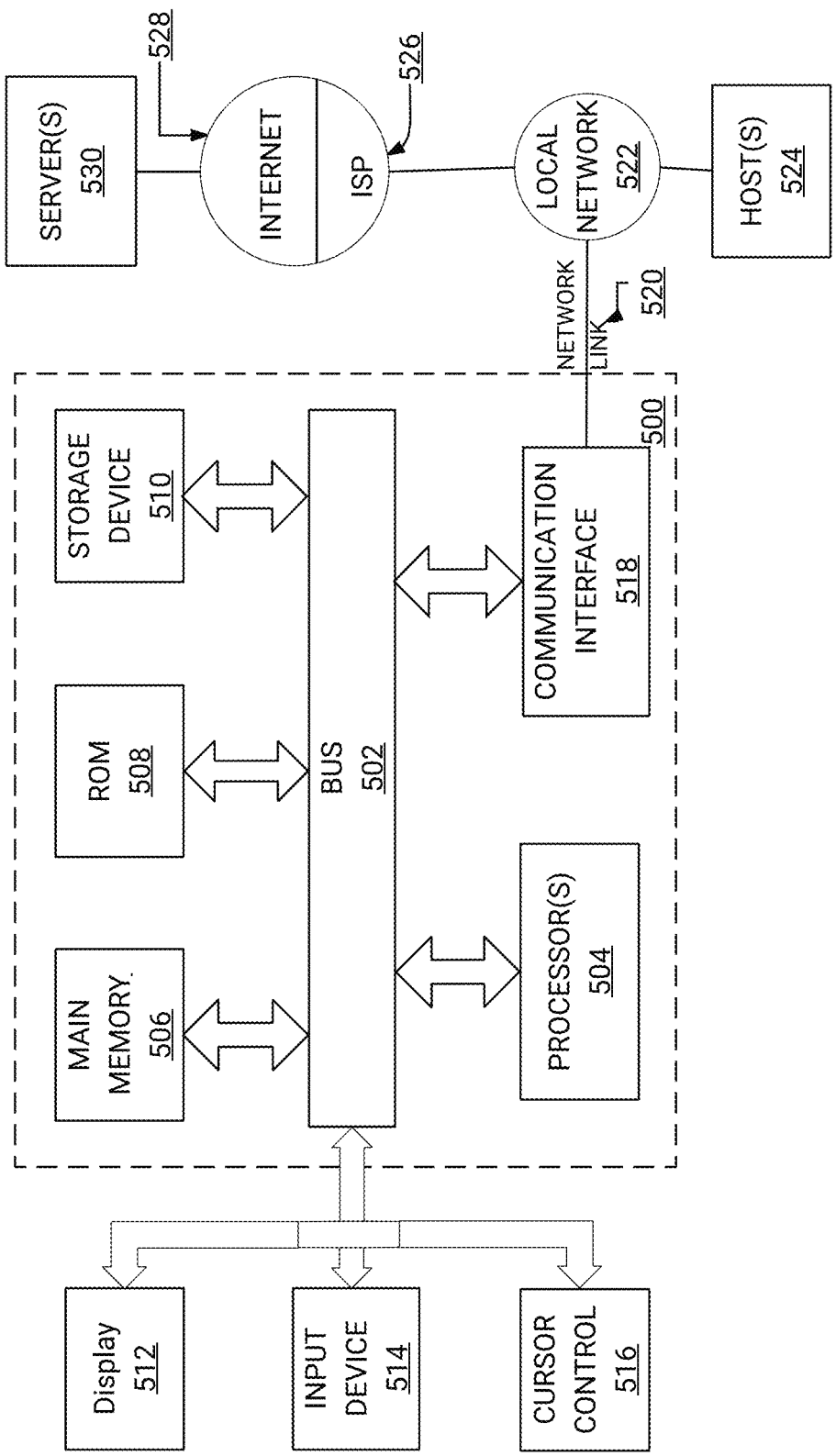
FIG. 5 illustrates a computer system with which certain methods discussed herein may be implemented.

For example, FIG. 5 is a block diagram that illustrates a computer system 500 upon which various embodiments may be implemented. For example, one or more computer systems 500 can optionally be the object monitoring system 100. Computer system 500 includes a bus 502 or other communication mechanism for communicating information, and a hardware processor, or multiple processors, 504 coupled with bus 502 for processing information. Hardware processor(s) 504 may be, for example, one or more general purpose microprocessors.

Computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

Computer system 500 may be coupled via bus 502 to a display 512, such as a cathode ray tube (CRT) or LCD display (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Computing system 500 may include a user interface module to implement a GUI that may be stored in a mass storage device as computer executable program instructions that are executed by the computing device(s). Computer system 500 may further, as described below, implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more computer readable program instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

Various forms of computer readable storage media may be involved in carrying one or more sequences of one or more computer readable program instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computer system comprising one or more computer processors configured to execute software code to perform operations comprising:

receiving a plurality of datasets, each dataset indicating information associated with one or more objects of a plurality of objects, and each dataset being associated with a time of generation or receipt;

accessing object definitional information usable to generate an updated dataset which joins information from one or more datasets, the object definitional information indicating:

a plurality of core fields associated with the plurality of objects, the core fields reflecting unique identifying information, secondary fields associated with the plurality of objects, the second fields reflecting information which is to be preserved, and for individual datasets of the plurality of datasets, an indication of a subset of the core fields and second fields which the individual dataset includes, wherein the updated dataset is generated based on the object definitional information, wherein the object definitional information is generated, at least in part, via an interactive user interface, and wherein the interactive user interface:

presents summary information associated with a particular dataset, the summary information representing, at least, a first column included in the particular dataset, and responds to user input directed to a graphical representation of the first column presented in the interactive user interface, wherein for a first type of user input directed to the graphical representation, the first column is designated as a core field, and wherein for a second type of user input directed to the graphical representation, the first column is designated as a secondary field;

maintaining the updated dataset to include information for the objects included in most recent versions of each of the plurality of datasets, wherein one or more datasets are replaced with more recent versions, wherein one or more other datasets are propagated to be the most recent versions, and wherein for a particular time, maintaining the updated dataset to include information for a particular object comprises:

identifying, for the particular time, whether more recent information is available for the particular object as compared to information included in the updated dataset and identifying a subset of the plurality of datasets which include more recent information for the particular object, from remaining datasets other than the subset of the plurality of datasets propagating information for the particular object to the updated dataset, the remaining datasets including information for the particular object, and updating the updated dataset via joining information for the particular object included in the identified subset of the plurality of datasets with the propagated information, such that the updated dataset includes current information for the particular object; and responding to a query received from a client, the query indicating a request for specific information related to one or more objects, the request specifying a time, wherein the computer system is configured to determine information for the one or more objects which is current for the specified time, the determined information being used for responding to the query.

2. The computer system of claim 1, wherein an object comprises a computing system, a user, an application, or a vulnerability.

3. The computer system of claim 1, wherein the operations further comprise:
modifying the datasets according to one or more cleaning processes.

4. The computer system of claim 1, wherein maintaining the updated dataset to include a most recent version of the particular dataset comprises:
receiving, at the particular time, a first version of the particular dataset, the first version including information associated with a first object, wherein information included in the first version is utilized in the updated dataset;
at a subsequent time, receiving a second version of the particular dataset, the second version not including information associated with the first object; and
causing the information included in the first version to be propagated to the subsequent time, such that for a query requesting information associated with the subsequent time, information for the first object that is included in the first version is utilized to respond.

5. The computer system of claim 1, wherein a type of information included in a representation of a dataset is a column included in the dataset, wherein the interactive user interface further enables a second column included in the particular dataset to be designated, based on user input, as a secondary field,
and wherein the updated dataset is updated to include information included in the second column.

6. The computer system of claim 1, wherein generating the updated dataset comprises accessing information indicating information to be utilized as a join key, and causing the joining of the datasets based on the join key.

7. A method comprising:
by a system of one or more processors:
accessing object definitional information usable to generate an updated dataset which joins information from one or more datasets, the object definitional information indicating:
a plurality of core fields associated with the plurality of objects, the core fields reflecting unique identifying information,
secondary fields associated with the plurality of objects, the second fields reflecting information which is to be preserved, and
for individual datasets of the plurality of datasets, an indication of a subset of the core fields and second fields which the individual dataset includes,
wherein the updated dataset is generated based on the object definitional information, wherein the object definitional information is generated, at least in part, via an interactive user interface, and wherein the interactive user interface:
presents representations of one or more datasets, and
responds to selection of one or more columns included in the representations of datasets, the selection being based on user input provided to graphical representations of the columns included in the interactive user interface, wherein a first type of user input designates a particular column as a core field, and wherein a second type of user input designates the particular column as a secondary field;
maintaining the updated dataset to include information for the objects included in most recent versions of each of the plurality of datasets, wherein one or more datasets are replaced with more recent versions, wherein one or more other datasets are propagated to be the most recent versions, and wherein for a particular time, maintaining the updated dataset to include information for a particular object comprises:
identifying, for the particular time, whether more recent information is available for the particular object as compared to information included in the updated dataset and identifying a subset of the plurality of datasets which include more recent information for the particular object,
from remaining datasets other than the subset of the plurality of datasets propagating information for the particular object to the updated dataset, the remaining datasets including information for the particular object, and
updating the updated dataset via joining information for the particular object included in the identified subset of the plurality of datasets with the propagated information, such that the updated dataset includes current information for the particular object; and
responding to a query received from a client, the query indicating a request for specific information related to one or more objects, the request specifying a time, wherein the computer system is configured to determine information for the one or more objects which is current for the specified time, the determined information being used for responding to the query.

8. The method of claim 7, wherein an object comprises a computing system, a user, an application, or a vulnerability.

9. The method of claim 7, further comprising:
   modifying the datasets according to one or more cleaning processes.

10. The method of claim 7, wherein maintaining the updated dataset to include a most recent version of a particular dataset comprises:
    receiving, at the particular time, a first version of the particular dataset, the first version including information associated with a first object, wherein information included in the first version is utilized in the updated dataset;
    at a subsequent time, receiving a second version of the particular dataset, the second version not including information associated with the first object; and
    causing the information included in the first version to be propagated to the subsequent time, such that for a query requesting information associated with the subsequent time, information for the first object that is included in the first version is utilized to respond.

11. The method of claim 7, wherein the presented representation of a particular dataset of the one or more datasets comprises summary information associated with the particular dataset, wherein the interactive user interface enables selection of particular columns in the particular dataset that are to be designated as core fields and/or secondary fields and, and wherein the updated dataset is generated to include the designated core fields and/or secondary fields.

12. The method of claim 7, wherein generating the updated dataset comprises accessing information indicating information to be utilized as a join key, and causing the joining of the datasets based on the join key.

13. Computer program product comprising non-transitory computer storage media, the computer program product storing instructions that when executed by a system of one or more computer processors cause the system to perform operations comprising:
    receiving a plurality of datasets, each dataset indicating information associated with one or more objects of a plurality of objects, each object being associated with a type of object, and each dataset being associated with a time of generation or receipt;
    accessing, for each type of object, object definitional information indicating:
       core fields reflecting unique identifying information associated with objects, the second fields reflecting information which is to be preserved,
       secondary fields reflecting secondary information associated with the objects, and
       for individual datasets of the plurality of datasets, an indication of a subset of the core fields and second fields which the individual dataset includes;
    generating an updated dataset based on the object definitional information, wherein the object definitional information is generated based on user input provided to an interactive user interface presenting summary information associated with the datasets,
    wherein a first type of user input provided to a first portion of the summary information indicates the first portion is a core field and wherein a second type of user input provided to a second portion of the summary information indicates the second portion is a secondary field;
    maintaining, for each type of object, the updated dataset to include most recent versions of each of the plurality of datasets, wherein one or more datasets are replaced with more recent versions, and wherein one or more other datasets are propagated to be the most recent versions, and wherein for a particular time, maintaining the updated dataset to include information for a particular type of object comprises:
       identifying, for the particular time, whether more recent information is available for the particular type of object as compared to information included in the updated dataset and identifying a subset of the plurality of datasets which include more recent information for the particular type of object,
       from remaining datasets other than the subset of the plurality of datasets propagating information for the particular type of object to the updated dataset, the remaining datasets including information for the particular type of object, and
       updating the updated dataset via joining information for the particular type of object included in the identified subset of the plurality of datasets with the propagated information, such that the updated dataset includes current information for the particular type of object;
    generating, based on the updated datasets, an ontological representation of each object, the ontological representation comprising information associated with the object and
    responding to queries received from clients, the queries indicating requests for specific information related to one or more objects, wherein a particular query indicates a time, and wherein responding to the particular query comprises:
       accessing ontological representations of the objects, the ontological representations comprising most recent versions of information associated with the objects at the indicated time, and
       responding to the query utilizing the ontological representations.

14. The computer program product of claim 13, wherein a type of object comprises a computing system, a user, an application, or a vulnerability.

15. The computer program product of claim 13, wherein the operations further comprise:
    modifying the datasets according to one or more cleaning processes.

16. The computer program product of claim 13, wherein maintaining the updated dataset for the particular type of object to include a most recent version of a particular dataset comprises:
    receiving, at the particular time, a first version of the particular dataset, the first version including information associated with a first object, wherein information included in the first version is utilized in the updated dataset;
    at a subsequent time, receiving a second version of the particular dataset, the second version not including information associated with the first object; and
    causing the information included in the first version to be propagated to the subsequent time, such that for a query requesting information associated with the subsequent time, information for the first object that is included in the first version is utilized to respond.

17. The computer program product of claim 13, wherein one or more core fields and one or more secondary fields are designated via the interactive user interface for a particular dataset, and wherein the updated dataset is generated to include the designated core fields and secondary fields.

18. The method of claim 7, wherein the first type of input comprises a first force applied to a display of a user device or a selection of the particular column for a first length of time, and wherein the second type of input comprises a second force applied to the display of the user device or a selection of the particular column for a second length of time.

19. The computer system of claim 1, wherein the first type of input comprises a first force applied to a display presenting the interactive user interface or a selection of the first column for a first length of time, and wherein the second type of input comprises a second force applied to the display or a selection of the first column for a second length of time.

20. The computer program product of claim 13, wherein the first type of input comprises a first force applied to a display presenting the interactive user interface or a selection of the first portion for a first length of time, and wherein the second type of input comprises a second force applied to the display or a selection of the second portion for a second length of time.

* * * * *